United States Patent
Beinborn et al.

(10) Patent No.: US 12,479,402 B2
(45) Date of Patent: Nov. 25, 2025

(54) FUEL REFILLING SYSTEM AND METHOD FOR EQUIPMENT POWERED BY FUEL

(71) Applicant: CUMMINS INC., Columbus, IN (US)

(72) Inventors: Aaron William Beinborn, Greenwood, IN (US); David P. Genter, Columbus, IN (US); Kieran J. Richards, West Haddon (GB); Brian K. Landes, Seymour, IN (US); Jithin Benjamin, Columbus, IN (US); Joseph P. Chandraraj, Austin, TX (US); Agneya Turlapati, Indianapolis, IN (US); Sravan Kumar Ragi, Columbus, IN (US); Heonjoong Lee, Columbus, IN (US); Michael Bates, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 338 days.

(21) Appl. No.: 18/187,448

(22) Filed: Mar. 21, 2023

(65) Prior Publication Data
US 2023/0322190 A1    Oct. 12, 2023

Related U.S. Application Data

(60) Provisional application No. 63/328,140, filed on Apr. 6, 2022.

(51) Int. Cl.
*B60S 5/02*   (2006.01)
*B60L 53/36*   (2019.01)
(Continued)

(52) U.S. Cl.
CPC .............. *B60S 5/02* (2013.01); *B60W 60/001* (2020.02); *F17C 5/007* (2013.01);
(Continued)

(58) Field of Classification Search
CPC ......... B60S 5/02; B60W 60/001; F17C 5/007; F17C 2201/056; F17C 2205/037; F17C 2221/012; F17C 2250/043; F17C 2265/065; F17C 2270/0178; F17C 2270/0184; H01M 8/04007; H01M 8/04201; H01M 2250/20; B60L 53/36; B60L 53/80
(Continued)

(56) References Cited

U.S. PATENT DOCUMENTS

| | | | | |
|---|---|---|---|---|
| 2007/0113921 A1* | 5/2007 | Capizzo | ................ | B60L 53/80 141/231 |
| 2016/0139600 A1* | 5/2016 | Delp | ..................... | B60K 35/10 701/26 |
| 2022/0402354 A1* | 12/2022 | Wang | ................. | H01M 50/249 |

FOREIGN PATENT DOCUMENTS

EP    4202287 A1 *   6/2023   .............. F17C 13/12

* cited by examiner

*Primary Examiner* — James J Lee
*Assistant Examiner* — Bernadette C Khakina
(74) *Attorney, Agent, or Firm* — Barnes & Thornburg LLP

(57) ABSTRACT

The present disclosure relates to systems and methods for optimizing refueling hydrogen in vehicles. Specifically, the present disclosure relates to identifying a refueling station, conducting a safety check on the vehicle based on a distance between the vehicle and the refueling station, switching a power source of the vehicle to only be a battery, swapping an empty or partially filled hydrogen fuel tank on the vehicle with a filled or partially filled hydrogen fuel tank at the refueling station, and switching the power source of the vehicle to include a hydrogen power source.

20 Claims, 8 Drawing Sheets

(51) Int. Cl.
  *B60L 53/80* (2019.01)
  *B60W 60/00* (2020.01)
  *F17C 5/00* (2006.01)
  *H01M 8/04007* (2016.01)
  *H01M 8/04082* (2016.01)

(52) U.S. Cl.
  CPC ... *H01M 8/04007* (2013.01); *H01M 8/04201* (2013.01); *B60L 53/36* (2019.02); *B60L 53/80* (2019.02); *F17C 2201/056* (2013.01); *F17C 2205/037* (2013.01); *F17C 2221/012* (2013.01); *F17C 2250/043* (2013.01); *F17C 2265/065* (2013.01); *F17C 2270/0178* (2013.01); *F17C 2270/0184* (2013.01); *H01M 2250/20* (2013.01)

(58) Field of Classification Search
  USPC .......................................................... 701/23
  See application file for complete search history.

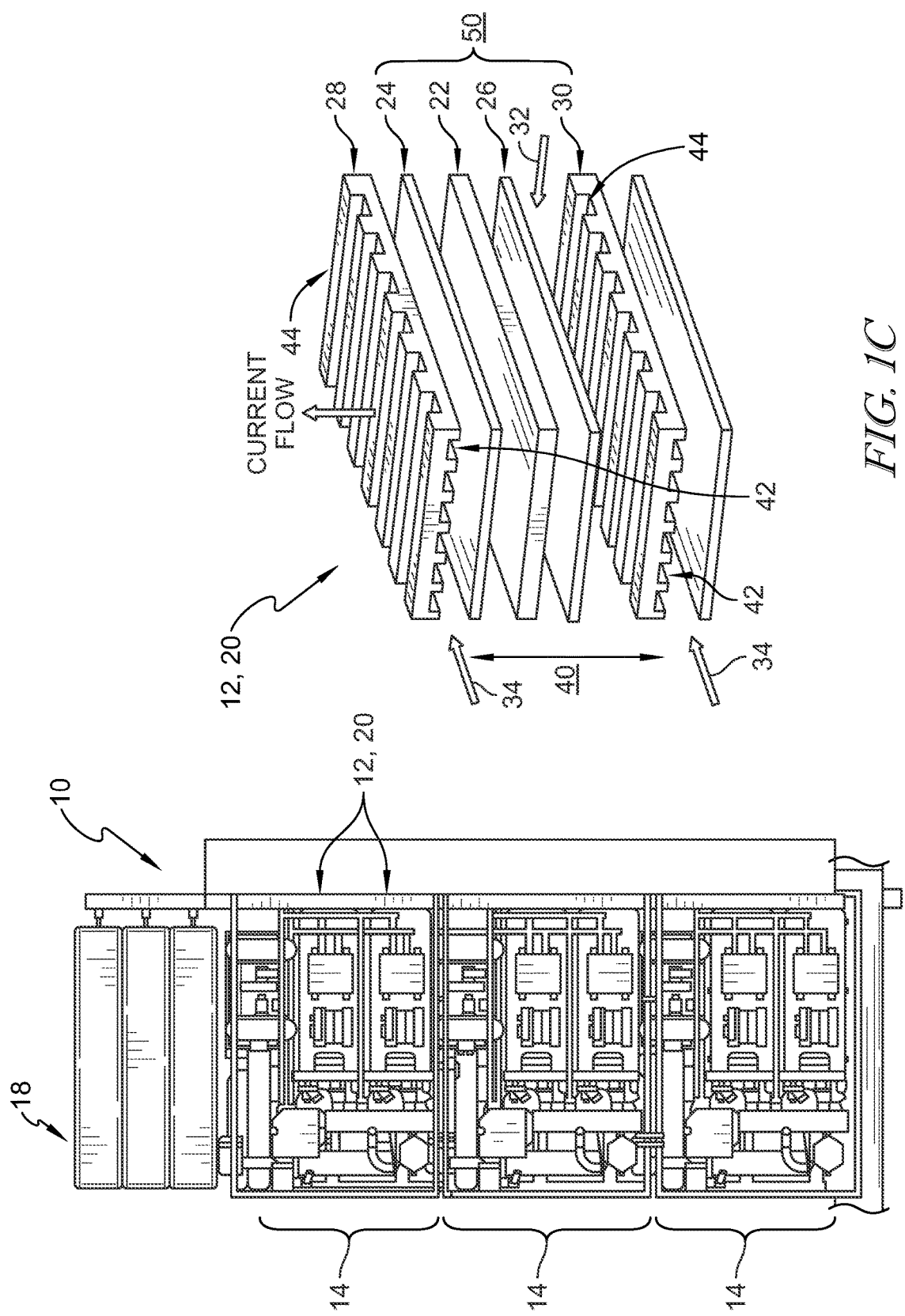

FUEL REFILLING SYSTEM AND METHOD FOR EQUIPMENT POWERED BY FUEL

CROSS-REFERENCE TO RELATED APPLICATIONS

This nonprovisional application claims the benefit and priority, under 35 U.S.C. § 119(e) and any other applicable laws or statues, to U.S. Provisional Patent Application Ser. No. 63/328,140 filed on Apr. 6, 2022, the entire disclosure of which is hereby expressly incorporated herein by reference.

TECHNICAL FIELD

The present disclosure relates to systems and methods for optimizing refueling hydrogen in equipment, powertrains, and/or vehicles.

BACKGROUND

Equipment, powertrains, or vehicles operators generally prefer to load the maximum quantity of fuel that can be stored in their fuel storage systems. This is especially true prior to a vehicle undertaking a journey or operating in resource limited settings. Most equipment, powertrains, or vehicles operators adopt this behavior because they prefer to minimize time and effort at refueling the equipment, powertrains, or vehicles. Further, operators typically seek to minimize risk associated with uncertainty, such as unanticipated traffic and weather conditions.

Hydrogen powered equipment, powertrains, and vehicles are becoming more widely desired to meet lower carbon emissions targets. Many equipment, powertrains, and vehicles manufacturers are looking to utilize hydrogen as their source of energy instead of more traditional fuels, such as diesel or natural gas. Equipment, powertrains, or vehicles operating on hydrogen-based power often store hydrogen in one or more fuel tanks that need to be refueled. However, it is currently a significant challenge to replace or replenish large volumes of hydrogen gas with the limited refueling rates of the current technology.

For example, mining applications operate year round, up to about 8,000 hours per calendar year, and the loss incurred during refueling of mining trucks can range from about $5,000 to about $20,000 per hour. Additionally, due to the reduced energy of the fuel on-board, hydrogen-powered equipment, powertrains, or vehicles must refuel three or more times as frequently as a comparably equipped diesel-powered product. This accentuates the need for minimizing the downtime associated with a refueling event. This is primarily because of the difficulty and the space required for storing hydrogen on-board equipment, powertrains, or vehicles.

Consequently, mining trucks currently need to be refueled after about every 6-7 hours. Furthermore, the time to refill hydrogen is significantly longer than the time to refill diesel in a mining truck. Additionally, infrastructure including improved nozzle technology is critical for reducing hydrogen-refueling time. On the other hand, diesel-mining trucks have a "fast fill" technology that enables a 1200-gallon tank to be refilled in about 10-15 minutes.

Safety checks and implementation of operation processes that ensure that vehicles with refueled hydrogen tanks are equipped and serviced to operate cost money and take time. Thus, there is a need for efficient hydrogen fueling strategies. For these and other reasons, the present disclosure provides systems and methods for increasing the efficiency of hydrogen-refueling in vehicles by eliminating in-situ refueling events that are implemented in vehicles with permanently mounted fuel tanks.

The present disclosure provides a vehicle configuration comprising fuel tanks that can be easily removed when their fuel content is low. The fuel tanks can be replaced with a pre-filled set of fresh tanks. Additionally, the present disclosure provides systems and methods to identify and replace fuel tanks based on their pressure ratings.

SUMMARY

Embodiments of the present disclosure are included to meet these and other needs.

In one aspect, described herein, a method of refueling a vehicle comprises identifying a refueling station, conducting a safety check on the vehicle based on a distance between the vehicle and the refueling station, switching a power source of the vehicle to only comprise a battery, swapping an empty or partially filled vehicle fuel tank on the vehicle with a filled station fuel tank at the refueling station, and switching the power source of the vehicle to include a hydrogen power source.

In some embodiments, the method may further comprise enabling a vehicle cooling system to cool the empty or partially filled vehicle fuel tank on the vehicle before swapping the empty or partially filled vehicle fuel tank with the filled station fuel tank. In some embodiments, the method may further comprise identifying a swap location located in the refueling station after switching the power source of the vehicle to only comprise the battery, wherein the filled station fuel tank is located at the swap location in the refueling station.

In some embodiments, the swapping the empty or partially filled vehicle fuel tank may comprise disconnecting the empty or partially filled vehicle fuel tank from the vehicle, removing the empty or partially filled vehicle fuel tank from the vehicle with a lifting equipment, moving the filled station fuel tank from the swap location into the vehicle with the lifting equipment, and aligning the filled station fuel tank in the vehicle. In some embodiments, the method may further comprise syncing one or more sensors in the swap location to one or more sensors on the vehicle.

In some embodiments, the method may further comprise enabling autonomous drive control of the vehicle before swapping the empty or partially filled vehicle fuel tank and enabling operator control of the vehicle after switching the power source of the vehicle to include the hydrogen power source. In some embodiments, the method may further comprise conducting the safety check comprises purging hydrogen from a hydrogen line in the vehicle and disconnecting electrical connections from the hydrogen line in the vehicle before swapping the empty or partially filled vehicle fuel tank with the filled station fuel tank.

In some embodiments, the method may further comprise reconnecting the hydrogen line in the vehicle and purging the hydrogen line in the vehicle before swapping the empty or partially filled vehicle fuel tank with the filled station fuel tank. In some embodiments, the method may further comprise providing the vehicle with a lifting equipment, wherein the lifting equipment is located at the identified swap location before swapping the empty or partially filled vehicle fuel tank with the filled station fuel tank.

In some embodiments, the method may further comprise identifying the refueling station, conducting the safety check on the vehicle, switching the power source of the vehicle to the battery, swapping the empty or partially filled vehicle fuel tank on the vehicle with the filled station fuel tank, or switching the power source of the vehicle to the hydrogen power source is automatically performed by a controller. In some embodiments, the method may further comprise charging the battery or swapping the battery for a different battery. In some embodiments, the method may further comprise refilling a first empty or partially filled vehicle fuel tank on the vehicle and swapping a second empty or partially filled vehicle fuel tank with the filled station fuel tank at the refueling station.

According to a second aspect, described herein, a system for refueling a vehicle comprises one or more vehicle fuel tanks on the vehicle, a refueling station with a swap location, a hydrogen-filling site, one or more station fuel tanks, and a system controller. The one or more station fuel tanks are filled with hydrogen and positioned at the swap location or at the hydrogen-filling site. The system controller is configured to be in communication with the refueling station, the swap location, and the hydrogen-filling site.

In some embodiments, the system may further comprise a hydrogen storage location and the system controller may be configured to determine a transfer of hydrogen from the hydrogen storage location to the hydrogen-filling site through a pipeline infrastructure. In some embodiments, the one or more empty station fuel tanks may be filled with hydrogen at the hydrogen-filling site through a quick connect mechanism.

In some embodiments, the vehicle may further comprise a sensor to determine a pressure of the one or more vehicle fuel tanks, an identifier on the one or more vehicle fuel tanks, and a vehicle controller configured to communicate the pressure of the one or more vehicle fuel tanks and the identifier on the one or more fuel tanks to the system controller. In some embodiments, the system controller may be configured to determine if the swap location includes one or more station fuel tanks compatible with the identifier on the one or more vehicle fuel tanks.

In some embodiments, the one or more vehicle fuel tanks may be swapped with one or more station fuel tanks at the swap location. In some embodiments, the one or more vehicle fuel tanks may be filled with hydrogen at the swap location. In some embodiments, the swap location may further comprise a lifting equipment to move and align the one or more station fuel tanks in the vehicle.

BRIEF DESCRIPTION OF THE DRAWINGS

These and other features, aspects, and advantages of the present disclosure will become better understood when the following detailed description is read with reference to the accompanying drawings, in which like characters represent like parts throughout the drawings, wherein:

FIG. 1B is a cutaway view of an exemplary fuel cell system including an air delivery system, an electrolyzer, and a plurality of fuel cell modules each including multiple fuel cell stacks;

FIG. 1C is a perspective view of an exemplary repeating unit of a fuel cell stack of the fuel cell system of FIG. 1A;

DETAILED DESCRIPTION

The present disclosure relates to systems and methods of refueling hydrogen in a vehicle 100 and/or a powertrain 100. The present disclosure is specifically directed to an implementing, swapping, and/or refilling strategy to minimize time expended during the refueling process of the vehicle 100 and/or powertrain 100. The present invention also prevents the need for a fueling station 110 (e.g., a fuel pumping station) to be located on the route. The location where the fuel tanks 108, 118 are filled does not need to be in the same location as the location where an equipment, vehicle, or powertrain 100 is refueled.

Figure 1A:
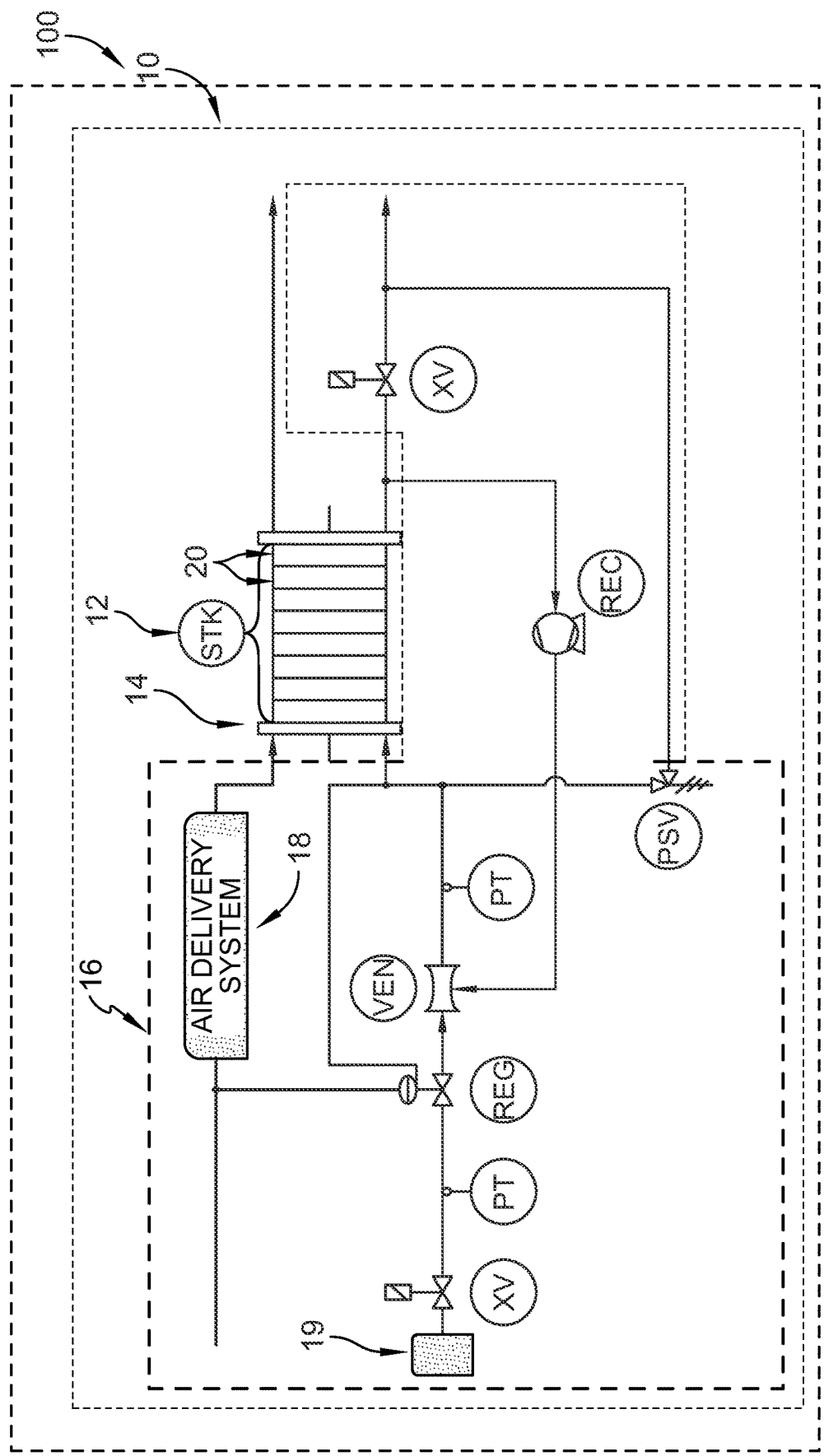
FIG. 1A is a schematic view of an exemplary fuel cell system including an air delivery system, an electrolyzer, and a fuel cell module including a stack of multiple fuel cells.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
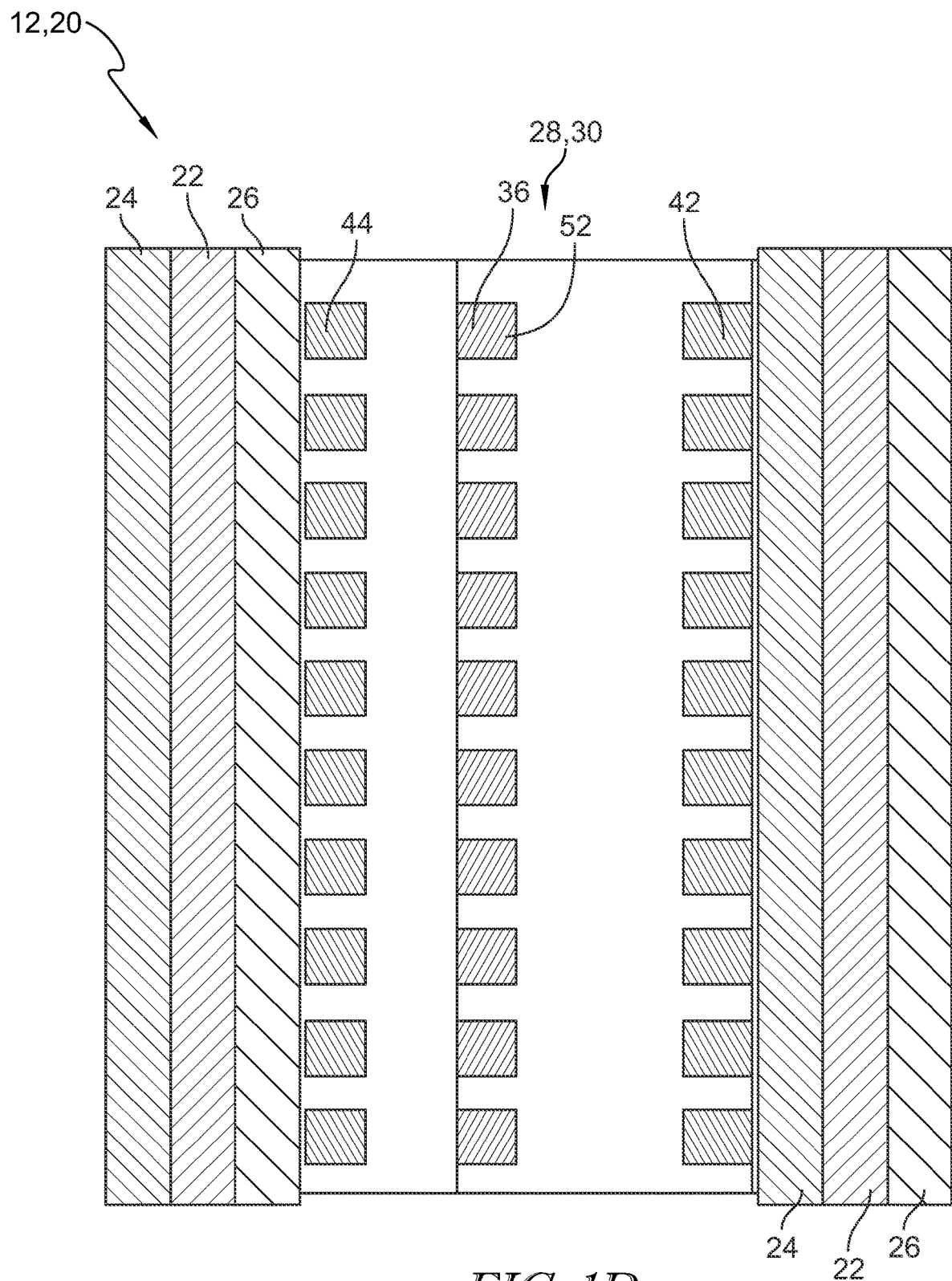
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system, or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

The vehicle 100 and/or powertrain 100 powered by the fuel cell 20 or fuel cell stack 12 can be a vessel, a marine vehicle or vessel, a train, a locomotive, a bus, a trolley, an airplane, or a stationary equipment (e.g., excavator). The vehicle 100 and/or powertrain 100 can be situated on or configured to be located on, or attached to a vessel, a marine vehicle or vessel, a train, a locomotive, a bus, or a mining equipment. The vehicle 100 and/or powertrain 100 can be an equipment or a device used on rail, used on the waterways, used on highways, used off highways, used in high altitude regions, or used underground.

The vehicle 100 can be powered by one or more power sources including a battery power source, a diesel engine power source, a fuel cell 20 or fuel cell stack 12 power source. The vehicle 100 can be powered by hybrid power sources including more than one power source. The vehicle 100 and/or powertrain 100 can be powered by fuel (e.g., diesel, hydrogen) or electricity.

Figure 2:
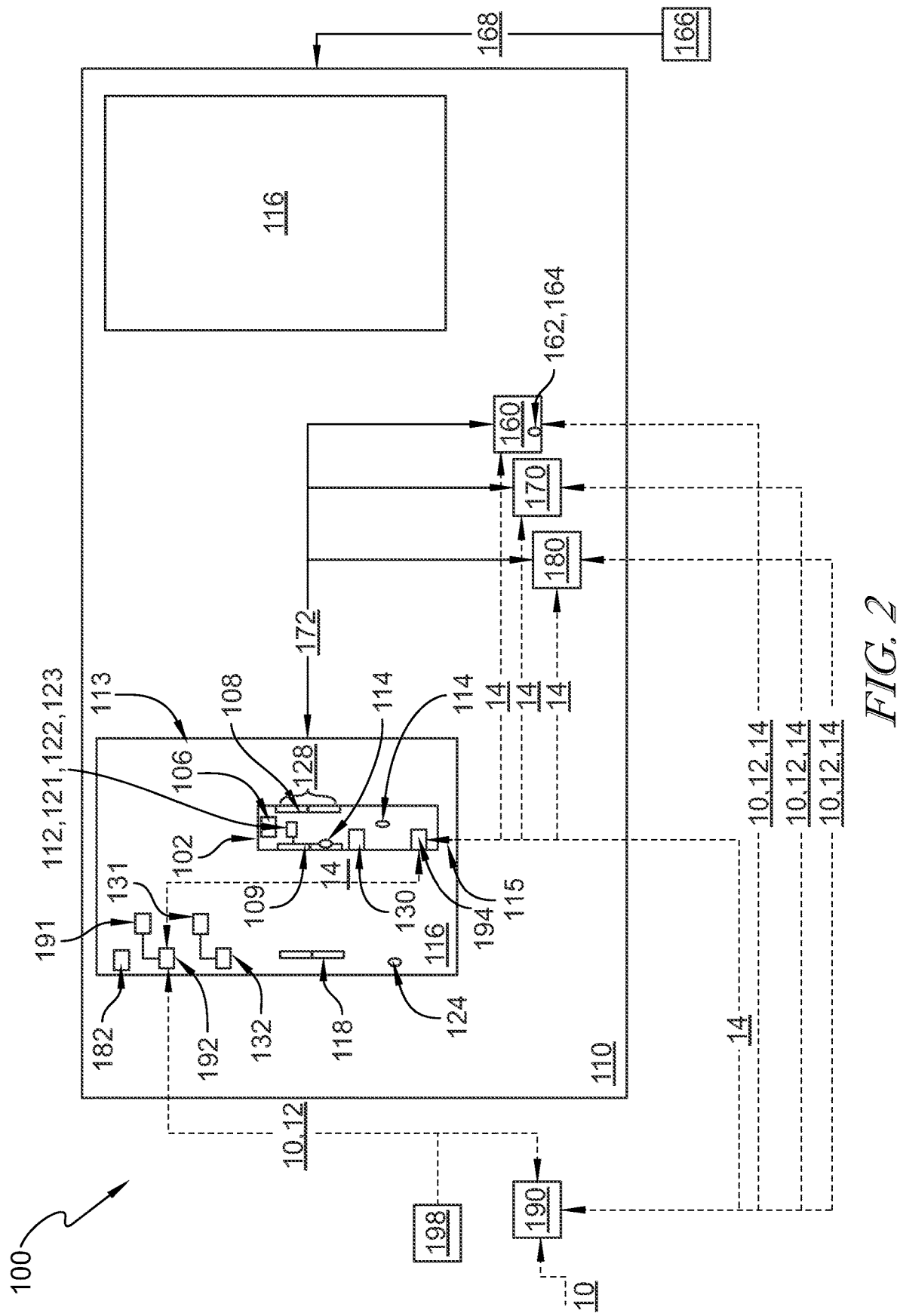
FIG. 2 is one embodiment of a system layout illustrating a fueling station.

In one exemplary system 101 shown in FIG. 2, the vehicle and/or powertrain 100 is a mining truck 102. The mining truck 102 is powered by one or more vehicle fuel tanks 108 that can be filled (e.g., with liquid hydrogen 19 or gaseous hydrogen 19) and/or one or more battery 106. The one or more vehicle fuel tanks 108 can be filled at a swap location or swap station 116 in a swap zone or a fueling station 110. The fuel station 110 can include one or more swap locations 116. The mining truck 102 can select any swap location 116 for refilling the one or more vehicle fuel tanks 108, swapping the one or more vehicle fuel tanks 108, charging the battery 106, or swapping the battery 106.

For purposes of the present disclosure, the vehicle 100 and mining truck 102 can be used interchangeably. In some embodiments, the vehicle 100 may be any prime mover, including but not limited to any vehicles 100 that use hydrogen 19 or other fuels, any vehicles 100 with internal combustion engines, and/or any vehicles 100 that use fuel cells 20 with hydrogen 19 or other fuels.

Refilling the vehicle fuel tank 108 includes filling liquid hydrogen 19 or gaseous hydrogen 19 in the vehicle fuel tank 108 in the mining truck 102 with or without removing or displacing the vehicle fuel tank 108 from the mining truck 102. Swapping the vehicle fuel tank 108 includes removing the fuel tank 108 from the mining truck 102 and replacing the vehicle fuel tank 108 with a station fuel tank 118 or some other vehicle fuel tank 108 (e.g., from a different vehicle 100). Swapping the battery 106 includes removing the battery 106 from the mining truck 102 and replacing the battery 106 with a different battery 106. Typically, swapping the vehicle fuel tank 108 includes replacing such with a different fuel tank 108 that has a greater amount of fuel than the vehicle fuel tank 108 (e.g., a full amount of fuel). Similarly, swapping the vehicle battery 106 typically includes replacing the vehicle battery 106 with a different battery 106 that has a greater charge than the vehicle battery 106 (e.g., a full charge). Charging the battery 106 includes increasing the charge in the battery 106 with or without removing or displacing the battery 106 from the mining truck 102.

The mining truck 102 is configured so that the one or more vehicle fuel tanks 108 are easily accessible, removable, and/or replaceable from outside the mining truck 102. Typically, there is only one vehicle fuel tank 108 located on one side of the mining truck 102 between the front and rear wheels. However, the mining truck 102 may include any number of vehicle fuel tanks 108. In an exemplary embodiment, the truck 102 may have a total of about one (1) to about twenty-four (24) vehicle fuel tanks 108, including any number comprised therein.

When the mining truck 102 includes more than one vehicle fuel tank 108, the vehicle fuel tanks 108 may be placed on both sides of the mining truck 102. While the vehicle fuel tanks 108 may be filled on only a single side of the mining truck 102, a configuration that includes the vehicle fuel tanks 108 being accessible, removable, and/or replaceable from both sides advantageously simplifies the mining truck 102 refueling process. Such a two-sided refilling configuration also minimizes the infrastructure needed for refueling. This two-sided refilling configuration that includes the vehicle fuel tanks 108 on both sides may also improve customer safety and reduce mining truck 102 operating costs and complexity due to the increased efficiency of refueling or refilling.

In one exemplary embodiment, the mining truck 102 may have twenty-four (24) vehicle fuel tanks 108. Twelve (12) of those vehicle fuel tanks 108 may be packaged together as one fuel tank assembly 128 that is positioned on one side of the mining truck 102. The rest of the vehicle fuel tanks 108 (e.g., 12 tanks) may be packaged together as one fuel tank assembly 128 positioned on the other side of the mining truck 102. The vehicle fuel tanks 108 in the fuel tank assembly 128 can be removed and reinstalled as an assembly or individually from the mining truck 102. In some embodiments, the vehicle fuel tanks 108 in the fuel tank assembly 128 can be removed and reinstalled as a single unit or assembly, and may not be removed individually, such as tank-by-tank from the mining truck 102.

As shown in FIG. 2, the presence of vehicle fuel tanks 108 on both sides of the mining truck 102 may also require that any refueling equipment 130 (e.g., lifting hardware 130) is also located on both sides of the mining truck 102. The presence of refueling equipment 130 on both sides of the mining truck 102 ensures that the vehicle fuel tanks 108 can be filled at the same time, simultaneously, and/or in parallel. The ability to refill the vehicle fuel tanks 108 in parallel and/or simultaneously allows an operator or driver of the mining truck 102 more flexibility in choosing the fueling station 110. The ability to refill the vehicle fuel tanks 108 in parallel also allows the operator to manage an inventory of the mining truck 102 whilst optimizing the refueling operations.

The vehicle fuel tanks 108 on both sides of the mining truck 102 can be removed at the same time or sequentially. Such ease of vehicle fuel tanks 108 removal decreases a refueling time of the mining truck 102 and eliminates the dependency of the refueling time of the mining truck 102 on a tank-refilling rate. The presence of refueling equipment 130 (e.g., lifting hardware 130) on both sides of the mining truck 102 ensures that less time is used to reposition the mining truck 102 and/or the refueling equipment (e.g., lifting hardware 130). Thus, the presence of refueling equipment (e.g., lifting hardware 130) on both sides of the mining truck 102 may also save time if the vehicle fuel tanks 108 on each side are refilled in series, one after the other, since no time is required to reposition the mining truck 102.

The station fuel tanks 118 filled with hydrogen 19 are located in the fueling station 110. The station fuel tanks 118 may be located at the swap location 116 or at a different location and/or zone in the fueling station 110. The mining truck 102 may implement a quick-swap method that allows one or more empty or partially filled vehicle fuel tanks 108 in the mining truck 102 to be replaced with one or more fully filled station fuel tanks 118 at the swap location 116 in the fueling station 110. In some embodiments, the quick-swap method may be implemented to refuel vehicles 100 using other types of fuels that are not hydrogen, which might require additional time for refueling in comparison to traditional. In some embodiments, the quick-swap method may be implemented to refuel vehicles 100 with compressed natural gas (CNG), liquid natural gas (LNG), diesel, and/or any other fuel.

An empty fuel tank 108, 118 may comprise about 10% or less of fuel, including any percentage or range comprised therein. A partially filled fuel tank 108, 118 can have any amount of fuel between about 10% to about 90% full, including any percentage or range comprised therein. In some embodiments, a partially filled fuel tank 108, 118 can be more than 10% full of hydrogen 19, but less than 100% full of hydrogen 19. For example, a partially filled fuel tank 108, 118 may include about 10% to about 30%, about 30% to about 60%, or about 60% to about 90% of hydrogen 19 or other fuel, including any percentage or range comprised therein.

Empty or partially filled station fuel tanks 118 can be filled with hydrogen 19 or other fuels during, and preferably before the mining truck 102 pulls into the fueling station 110. Station fuel tanks 118 may be refilled at one common location in the fuel station 110 and may be used at one or more swap locations 116. Alternatively or additionally, the station fuel tanks 118 may be refilled at more than one location in the fueling station 110.

Such refilling of the station fuel tanks 118 can be done before the mining truck 102 approaches the fueling station 110, while the mining truck 102 approaches the fueling station 110, and/or after the mining truck 102 approaches the fueling station 110. More than one station fuel tank 118 can be simultaneously refilled before the mining truck 102 approaches a refueling window. The refueling window is the time between when the mining truck 102 can be refueled without the risk of running out of fuel and when the mining truck 102 has a risk of running out of fuel. For example, if the refueling window has been exhausted or has expired, the mining truck 102 can only come into the fueling station 110 by using electric power from the battery 106, since no fuel will be available to power the fuel cells 20. To ensure the mining truck 102 will not run out of fuel, there may be a buffer amount of fuel provided in the vehicle fuel tank 108, such that when the vehicle fuel tanks 108 are removed from the mining truck 102, the vehicle fuel tanks 108 are not completely empty. The buffer amount of fuel may range from about 1% to about 20% of the total volume or amount of a full fuel tank 108, including any specific or range of fuel comprised therein (e.g., typically at or about 5%).

Each station fuel tank 118 can be brought "just in time" to the swap location 116 in the fueling station 110 to help reduce inventory and dependency on a fixed refilling location. "Just in time" suggests that there may not be many station fuel tanks 118 at the fueling station 110 waiting to be uploaded onto the vehicles 100 (e.g., the mining truck 102) entering the fueling station 110. Instead, stations fuel tanks 118 may be brought to the fueling station 110 just in time for use in the vehicle 100 approaching at the fueling station 110. The fueling station 110 may include a limited amount of inventory of filled station tanks 118 closely aligning with the number of vehicles 100 requiring refueling. The number of station tanks 118 at the fueling station 110 may be based on an average number of vehicles 100 being refueled in a given time period (e.g., any hour or a day). Thus, loss of time due to a serial refilling process while the mining truck 102 is at the swap location 116 can be mitigated.

A vehicle-refueling event can include filling the station fuel tanks 118 located in the filling station 110 or at the swap location 116 and/or swapping the vehicle fuel tank 108 on the mining truck 102 with the filled station fuel tanks 118. The process of filling a station fuel tank 118 with hydrogen 19 or other fuel is a station fuel tank 118 refilling event. The quick-swap method includes filling the station fuel tanks 118 before the mining truck 102 enters the swap zone 116, which decreases the time the mining truck 102 spends at the swap location 116, since the filled or full station fuel tank 118 only need to be swapped for the empty or partially filled vehicle fuel tank 108 on the mining truck 102 and do not need to be filled.

The implementation of the quick-swap method or process decouples the vehicle-refueling event from the station fuel tank 118 refilling event. The quick-swap method allows the time for the vehicle-refueling event to be minimized. The quick-swap method allows the time for the vehicle-refueling event to be independent of the time for the station fuel tank 118 refilling event, which is typically advantageous.

The quick-swap method is implemented to ensure a quick and safe swapping of one or more station fuel tanks 118 with the empty or partially filled vehicle fuel tanks 108 in the mining truck 102. The quick-swap method includes preparation of the mining truck 102 for a swap, performance of a safety check in the mining truck 102, preparation of the swap location 116 for the swap, determination of the presence of fuel at the fueling station 110, guidance of the mining truck 102 to the swap location 116, and/or execution of environmental checks.

Environmental checks can include assessing the occurrence of rain, lightning activity, or proximity to other sources of heat or high voltage power at the swap location 116. The mining truck 102 may enter the swap location 116 on Electric Vehicle (EV)-only power (e.g., fuel cell power). In addition, when approaching the fueling station 110, evacuation fans 117 may be energized in the mining truck 102 to ensure any hydrogen 19 that leaks will not pool inside or near the vehicle fuel tanks 108 or the engine, but may be extracted from there.

The implementation of the quick-swap method includes the use of a controller 190 and/or a communication system 198. The controller 190 and/or the communication system 198 enables communication between the mining truck 102, the swap location 116, and/or the fueling station 110. Additionally or alternatively, the controller 190 is also configured to communicate with one or more controlling stations 193 not in the vicinity of the fueling station 110. Communication between the mining truck 102, the swap location 116, and/or the fueling station 110 can be performed manually or automatically.

The vehicle or mining truck 102 may be autonomously driven or manually driven by the operator or driver. Typically, if the vehicle or mining truck 102 is being driven manually, the vehicle fuel tanks 108 may be replaced when the driver is fatigued, requires a meal or a bathroom break, or otherwise needs a break. However, autonomous driving necessitates the need for the "quick-swap" refueling method because a refueling event cannot take place during such required breaks. Downtime to refuel may be purely incremental to the autonomously driven mining truck 102 hauling commodity.

The quick-swap method can be implemented in different ways. For example, the fueling station 110 can have different loading and unloading swap locations 116. Alternatively or additionally, both loading and unloading may be performed in one or the same swap location 116. The fueling station 110 may also have the capability to simultaneously cater to multiple mining trucks 102 or other vehicles 100 at multiple swap locations 116. The fueling station 110 may also be configured so that the mining truck 102 can unload empty or partially filled vehicle fuel tanks 108 at one location and can load filled or full station fuel tanks 118 at another location of the swap location 116.

Each fueling station 110 may include one or more than one swap location 116. If the fueling station 110 includes only one swap location 116, the functions and characteristics of the fueling station 110 and the swap location 116 may be the same and may include the combined functions and characteristics of each respective area or zone, as discussed above. The swap location 116 can be configured into two levels or regions—one level or region 113 (e.g., a first level or region) to unload and receive usedvehicle fuel tanks 108 (e.g., empty or partial filled tanks 108). Another level or region 115 (e.g., a second level or region) to hold filled or full station tanks 118 and load the filled or full station tanks 118 onto the mining truck 102.

Figure 3:
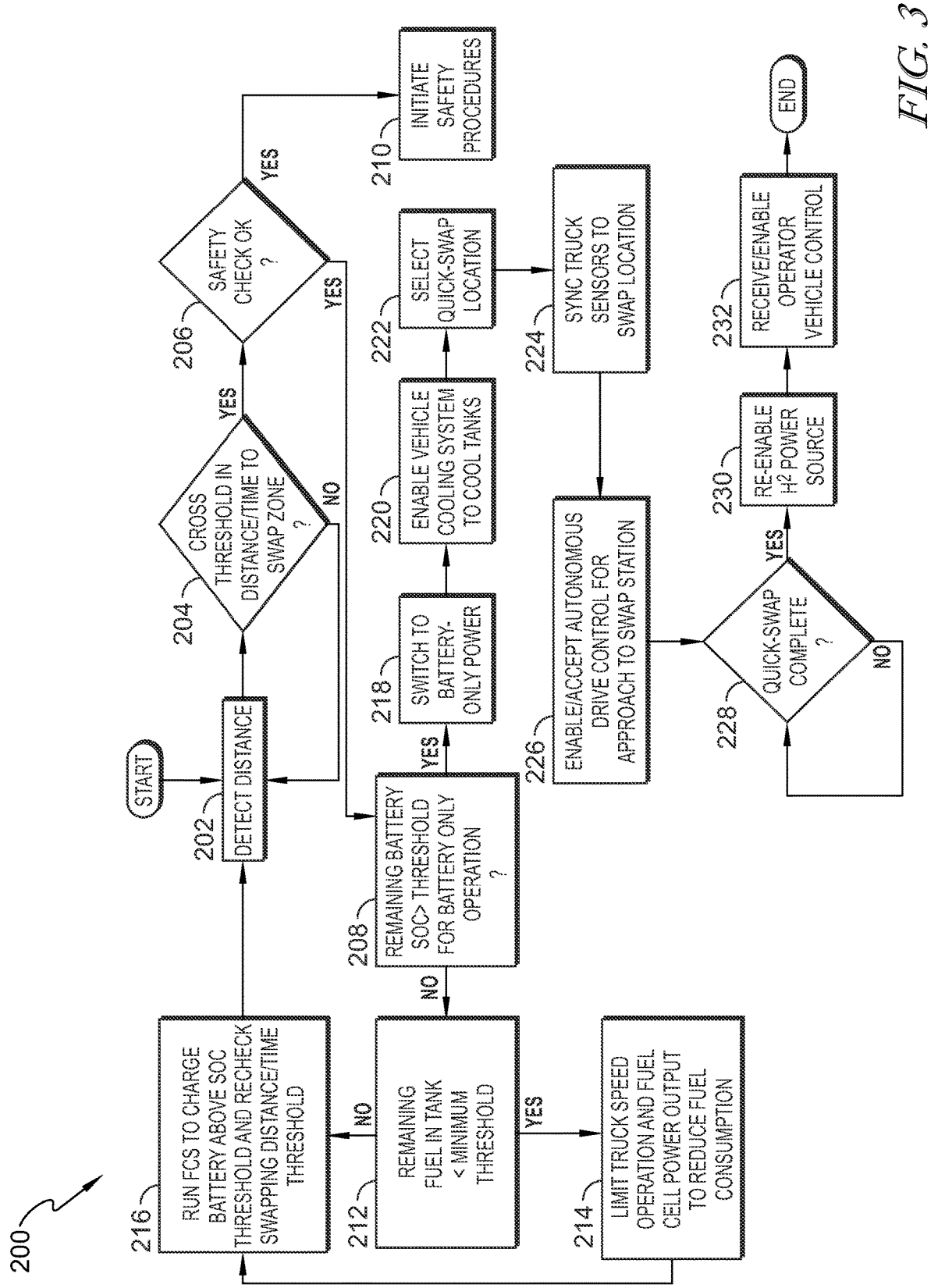
FIG. 3 is a flowchart illustrating a quick-swap method implemented by a mining truck.

FIG. 3 illustrates a flowchart 200 outlining one embodiment of the quick-swap method that may be implemented by the vehicle 100 (e.g., the mining truck 102 in FIG. 2). Referring to FIGS. 2 and 3, the controller 190 can initiate the preparation of the mining truck 102 for the quick-swap process by ensuring that the mining truck 102 is prepared for refueling. For example, in step 202, the controller 190 of the vehicle 100 or mining truck 102 determines the distance between the mining truck 102 and the fueling station 110. The controller 190 may also have access to, implement, and/or utilize real-time global information 62 such as weather conditions, traffic conditions, and/or road conditions when determining the distance between the mining truck 102 and the fueling station 110.

The phrase 'real-time' refers to at least one of the times of occurrence of the associated events, the time of measurement and collection of predetermined data, the time to process the data, and the time of a system response to the events and the environment occur instantaneously or substantially instantaneously. Systems, components, and/or methods operating or functioning in real-time are doing so instantaneously or substantially instantaneously (e.g., in the present or current time). For example, real-time global information 62 is information or data that can be accessed instantaneously or substantially instantaneously by the controller 190.

Based on a predetermined distance threshold or time threshold dictated by the location of the fueling station 110, the controller 190 continues to monitor the distance between the mining truck 102 and the fueling station 110 in step 202. If the distance threshold or the time threshold (time to reach the fueling station 110) is met in step 204, the controller 190 initiates a safety check in step 206. The determination of the distance threshold or the time threshold may be dependent on a time required to complete the safety check in the mining truck 102.

For example, the time or fuel burned to go from a location in the mine to the fueling station 110 can be determined. These resources may be determined and/or calculated by static calibration on a mine site layout, based on GPS coordinates or GPS plans, as determined by the controller 190. Alternatively or additionally, an alert or broadcast can be implemented by the controller 190 or the communication system 198 when the mining truck 102 is in need of refueling before continuing to operate. The time and/or fuel burned to finish the current operating route is compared to the time for the mining truck 102 to get to the fueling station 110 in order to determine distance and time thresholds.

During the safety check in step 206, the controller 190 checks for battery 106 failure and/or damage in the mining truck 102 and determines if a thermal runaway condition or a pre-thermal runway condition exists. If there is a thermal runaway condition or pre-thermal runway condition present (e.g., where the battery 106 is at risk of catching on fire or is on fire) as determined by the controller 190, the mining truck 102 is prevented from entering the fueling station 110. Such a thermal runaway condition or pre-thermal runway condition can be detected by the controller 190. For example, if a thermal runaway condition or a pre-thermal runway condition is detected by the controller 190, the mining truck 102 may be prohibited by the controller 190 from driving within a predetermined distance of fueling station 110. Alternatively or additionally, the mining truck 102 may be directed to a designated safety zone, such as a zone away from any station fuel tanks 118 or hydrogen 19 source by the controller 190.

If the safety check in step 206 fails due to a battery 106 failure and/or damage, the controller 190 determines whether the battery 106 failure occurred near any of the one or more vehicle fuel tanks 108 in the mining truck 102. If the damaged battery 106 is detected near the vehicle fuel tanks 108, the mining truck 102 is deemed inoperable for refueling. A fuel cell 20 in the mining truck 102 starts feeding the DC bus, and the mining truck 102 is geofenced away from the fueling station 110. Through geofencing, the mining truck 102 can determine the location of the fueling station 110.

For example, in utilizing geofencing, if the safety check in step 206 fails, the mining truck 102 can be disabled from crossing a certain boundary. For example, if the safety check in step 206 fails, the mining truck 102 is disabled from crossing into a boundary or zone where there is a large quantity of hydrogen 19 or potential extraneous hydrogen 19 gas (e.g., a fueling station 110). During the safety check in step 206, if a damaged battery 106 is detected by the controller 190 before the mining truck 102 reaches the fueling station 110, the battery 106 is manually or automatically drained to zero. Once in a proper location, the operator of the mining truck 102 can swap the damaged battery 106 for an undamaged battery 106.

Battery 106 swap is typically performed at a site different from and/or away from the fueling station 110. Battery 106 swap is typically not performed at the same time as vehicle refueling or tank filling. Battery 106 swap is typically not performed at the same time as one or more of the vehicle fuel tanks 108 in the mining truck 102 is being replaced or swapped. In some embodiments, battery 106 swap may or may not occur at any time as it may or may not be necessary.

After the safety check in step 206, the controller 190 determines if the state of charge (SOC) available in the battery 106 is greater than an operation threshold required for the mining truck 102 to be exclusively powered by the battery 106, as shown in step 208. The controller 190 then initiates safety procedures in the mining truck 102 in step 210. If the SOC available in the battery 106 is not greater than an operation threshold required for the mining truck 102 to be exclusively powered by the battery 106, the controller 190 determines if the remaining fuel in the vehicle fuel tanks 108 is less than a minimum fuel threshold in step 212. The minimum fuel threshold is based on the mining truck 102 operation, mine site maps, and/or proximity to fueling stations 110. If the remaining fuel in the vehicle fuel tanks 108 is less than a minimum fuel threshold, the controller 190 limits the mining truck 102 operation and the fuel cell 20 power output to reduce fuel consumption in step 214 before executing step 216.

If the remaining fuel in the vehicle fuel tanks 108 is not less than a minimum fuel threshold, the controller 190 directly executes step 216. In step 216, the controller 190 operates the fuel cells 20 in the mining truck 102 to charge the battery 106 and increase the state of charge of the battery 106. The state of charge of the battery 106 is increased above the operation threshold required for the mining truck 102 to be exclusively powered by the battery 106. The controller 190 then determines the distance between the mining truck 102 and the fueling station 110 and executes step 202.

If the state of charge available in the battery 106 is greater than the operation threshold required for the mining truck 102 to be exclusively powered by the battery 106, the controller 190 switches the operation of the mining truck 102 to be exclusively powered by the battery 106 in step 218. The controller 190 also enables a vehicle cooling system 119 to cool the vehicle fuel tanks 108 in the mining truck 102 in step 220 and selects a swap location 116 at the fueling station 110 in step 222.

The one or more sensors 114 in the mining truck 102 are synced to the swap location 116 in step 224. The one or more sensors 114 in the mining truck 102 may be synced to a station controller 192 in the swap zone 116. Separate station controllers 192 may be located at each swap location 116 in the fueling station 110 or one station controller 192 may be used for all swap locations 116 in the fueling station 110.

The fueling station 110 or the swap location 116 can manually or automatically accept drive control of the mining truck 102 and direct the mining truck 102 to approach a specific swap location 116 in step 226. Through autonomous driving where the swap location 116 accepts drive control, the mining truck 102 can enter the fueling station 110 in a very prescriptive way through GPS control. This enables the mining truck 102 to approach the fueling station 110 consistently with regular parameters including the proximity of the mining truck 102 to the refueling or lifting equipment 132.

The fueling station 110 or swap location 116 can control or guide the mining truck 102 during the refueling process. In some embodiments, the mining truck 102 may be guided into predetermined pits or locations. The swap location 116 may include locations for the mining truck 102 to be parked next to a prebuilt mound. In some embodiments, autonomous drive control of the mining truck 102 may be enabled when it is exclusively powered with the battery 106. Additionally, in some embodiments, the driver or operator may redeem and/or regain control of the mining truck 102 after the mining truck 102 is repowered or refueled with a hydrogen power source (e.g., vehicle fuel tank 108).

When the mining truck 102 reaches the swap location 116, prefilled, filled, and/or full station fuel tanks 118 in the swap location 116 are manually, electronically, mechanically, and/or automatically swapped with empty or partially filled vehicle fuel tanks 108 in the mining truck 102. In some embodiments, the fueling station 110 may use one or more guide pins or machines to locate the station fuel tanks 118 at the swap location 116. In some embodiments, batteries 106 in the mining truck 102 can be swapped at the same time or simultaneously as the vehicle fuel tanks 108 are swapped.

The controller 190 determines the completion of the quick-swap in step 228. Once the quick-swap process is completed, the hydrogen power source in the mining truck 102 is re-enabled in step 230. The controller 190 may receive or enable operator control in the mining truck 102 in step 232. Enabling operator control allows the mining truck 102 to be manually controlled.

The number of station fuel tanks 118 available at any given time is optimized for cost and usage so that the fueling station 110 does have an excess or dearth of station fuel tanks 118. This fueling station 110 optimization is synchronized with user or customer demand, which could vary on a daily or an hourly basis.

Figure 6:
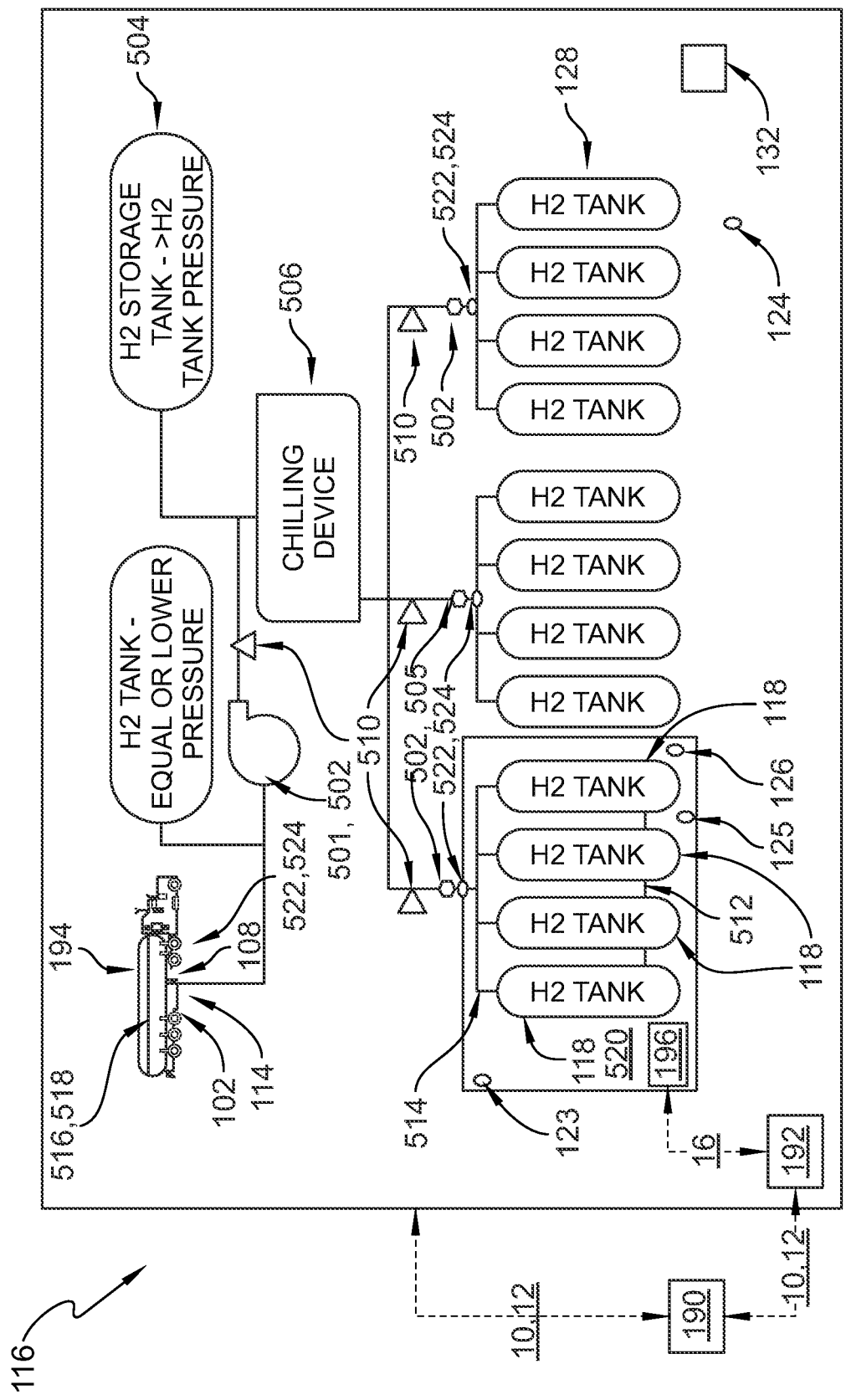
FIG. 6 is a schematic depicting the use of a dispensing nozzle to fill fuel tanks and tank systems in a swap location.

Referring to FIGS. 2 and 6, the mining truck 102 can include a vehicle controller 194 that transmits or communicates information 64 to the swap location 116, a hydrogen-filling site 180, a hydrogen storage site 170, and/or a hydrogen production or generation site 160. The information 64 transmitted can include the type and number of vehicle fuel tanks 108 in the mining truck 102 and if the vehicle fuel tanks 108 are empty, fully filled (e.g., full), or partially filled with hydrogen 19. The information 64 transmitted may also include the specific location of the vehicle fuel tanks 108 on the mining truck 102, the number of vehicle fuel tanks 108 that need to be swapped or replaced, and/or the time available for completing the swap or replacement.

Additionally, the information 64 transmitted from the controller 194 may be based on upcoming route information, mining duty cycle (or load factor), aggressiveness of the mining truck 102 to burn fuel across a certain mining route or route from another application, battery 106 state of charge and health, and time to arrive at fueling station 110. Each mining truck 102 can transmit such information to one or more fueling stations 110 or swap locations 116 simultaneously or as needed.

The information 62, 64, transmitted or communicated to the swap location 116 is used to ensure that the necessary number of station fuel tanks 118 are available prior to the arrival of the mining truck 102. Station fuel tanks 118 at the fueling station 110 are electronically, mechanically, manually, and/or automatically checked and selected based on the information 62, 64 transmitted to the swap location 116. The information 62, 64 about the mining truck 102 may be communicated to the fueling station 110 by the controller 190 or the station controller 192.

The information 62, 64 transmitted or communicated to the hydrogen production or generation site 160 may include any information, including information about the number of vehicles entering the fueling station 110, power train and/or vehicle architecture of the mining truck 102 or other vehicles 100 entering the fueling station 110, operational status of the mining truck 102 or other vehicles 100 entering the fueling station 110, and/or a current or real-time status (e.g., state of charge, fuel level) of any power sources of the mining truck 102 or other vehicles 100 entering the fueling station 110. Additionally or alternatively, the information 62, 64 transmitted or communicated to the hydrogen production or generation site 160 may include the number of vehicle fuel tanks 108 being swapped, the capacity of the vehicle fuel tanks 108 being swapped, and/or operational information of mines located close to the fueling station 110.

The selected station fuel tanks 118 are compatible with the mining truck 102. The selected station fuel tanks 118 are prefilled with hydrogen 19 at the hydrogen-filling site 180. The prefilled station fuel tanks 118 are moved into location for the quick-swap before, after, and/or while the mining truck 102 approaches the swap location 116.

In some embodiments of the fueling station 110, hydrogen 19 may be generated or produced onsite at the hydrogen production or generation site 160 and may be subsequently stored at the hydrogen storage site 170. In other embodiments, hydrogen 19 may be transferred from an offsite hydrogen production or generation site 166 to the hydrogen storage site 170 in the fueling station 110. If the fueling station 110 is equipped to produce hydrogen 19 onsite, then the production of hydrogen 19 is optimized to meet the demand for prefilled station fuel tanks 118. The production of hydrogen 19 also depends on the cost of production, grid consumption, and/or peak hour consumption. Optimizing the production of hydrogen 19 may include minimizing peak hour consumption.

The vehicle controller 190 and/or the station controller 192 can communicate vehicle refueling information 62, 64 to a hydrogen generation system 162 at the onsite or offsite hydrogen production or generation site 160, 166. The hydrogen generation system 162 can be one or more electrolyzers 164 in the centralized onsite hydrogen production or generation site 160 in the fueling station 110 or at an offsite hydrogen production or generation site 166. The hydrogen generation system 162 can determine hydrogen 19 generation based on the number of station fuel tanks 118 that need to be refilled immediately or periodically. This determination may be based on a time period that ranges from about 30 minutes to about 24 hours, including any time or range of time comprised therein. For example, the time period may range from about 30 minutes to about 1 hour, about 1 hour to about 4 hours, about 4 hours to about 12 hours, or about 12 hours to about 24 hours, including any time or range of time comprised therein.

The onsite hydrogen production or generation site 160 can operate one or more electrolyzers 164 based on the information 62, 64 received from the vehicle controller 190 or the station controller 192 and based on other factors, such as grid cost. The hydrogen generation system 162 can have energy storage systems to ensure power supply to the electrolyzers 164 during peak times to help minimize the cost of electricity and to minimize the overall cost of hydrogen production. An offsite hydrogen production or generation site 166 will require a pipeline infrastructure 168 to the fueling station 110 or an infrastructure that includes fuel delivery vehicles that service the hydrogen storage site 170 at the fueling station 110.

The hydrogen-filling sites 180, 182 may be a common onsite hydrogen-filling site 180 at the fueling station 110. Alternatively, the hydrogen-filling sites 180, 182 may be an individual hydrogen-filling site 182 located in each swap location 116. In some further embodiments, station fuel tanks 118 may be filled or prefilled at an offsite hydrogen-filling site, transported to the fueling station 110, and/or then distributed to the different swap locations 116. The hydrogen-filling sites 180, 182 are equipped with empty station fuel tanks 118.

The fueling station 110 includes a fuel delivery pipeline infrastructure 172. When the station fuel tanks 118 are filled at the swap locations 116, the fuel delivery pipeline infrastructure 172 may be configured to connect the hydrogen storage site 170 or the onsite hydrogen production or generation site 160 to each swap location 116. When the station fuel tanks 118 are filled at the common onsite hydrogen-filling site 180, the fuel delivery pipeline infrastructure 172 may be configured to connect the hydrogen storage site 170 or the onsite hydrogen production or generation site 160 to the common onsite hydrogen-filling site 180.

Referring again to FIGS. 2 and 3, the mining truck 102 is subjected to a safety procedure 210 after the completion of the safety check in step 206. The safety procedures may be implemented before the implementation of any battery 106 swap and before any quick-swap of vehicle fuel tanks 108 in the mining truck 102. An exemplary set of safety procedures that are implemented at various stages of the quick-swap process is illustrated in the flowchart 300, shown in FIG. 4.

Figure 4:
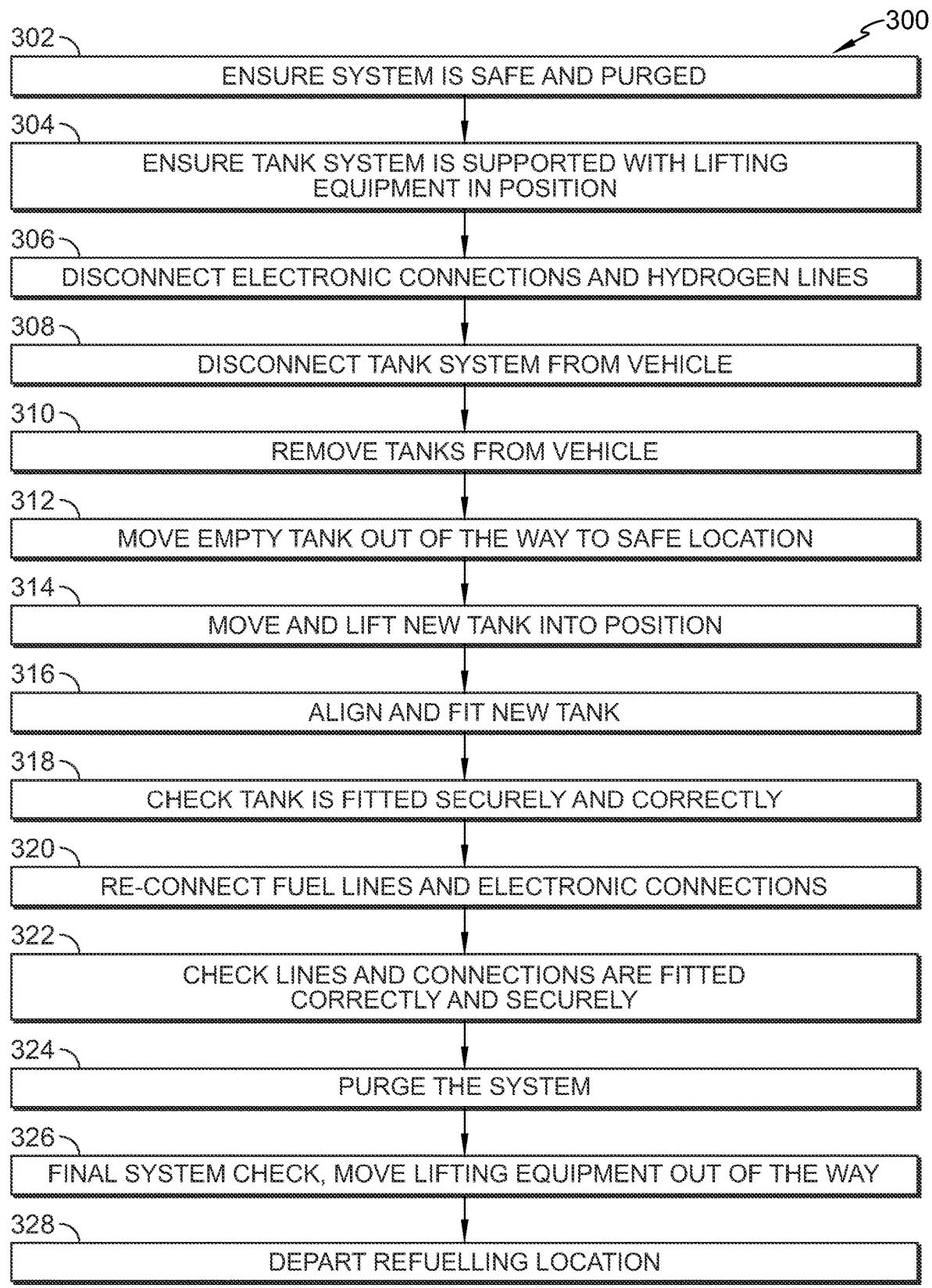
FIG. 4 is a flowchart illustrating a set of safety procedures that are implemented at various stages of the quick-swap method of FIG. 3.

Referring to FIGS. 2 and 4, various components 112 including one or more pipes, devices, hydrogen lines, and/or electronic connections used to transport hydrogen 19 in the mining truck 102 are electronically, mechanically, manually, and/or automatically purged of hydrogen 19 by the controller 190 or the vehicle controller 194 in step 302. The various components 112, including pipes and devices, are purged before the mining truck 102 arrives at the swap location 116.

The various components 112 including pipes and devices are purged in a controlled manner by implementing automatic valves 122 in the hydrogen system of the mining truck 102. The controller 190, the vehicle controller 194, and/or the onboard sensors 114 can be used to determine that the mining truck 102 is safe. The controller 190 or the vehicle controller 194 can indicate (e.g., to a ground team or an operator) through a visual (e.g. a flashing and/or color light), audio (e.g., an alarm and/or an alarming sound), or other indicator 191 that the mining truck 102 is safe to proceed with the quick-swap method. The indicator 191 to the ground team or operator may be communicated by an automatic unlocking of any necessary refueling equipment 130 (e.g., lifting hardware 130) on the mining truck 102.

Verification of necessary refueling equipment (e.g., lifting hardware 130) on the mining truck 102 is done in step 304 of FIG. 4. The mining truck 102 can be equipped with one or two types of quick-swap lifting hardware 130. The lifting hardware 130 can either be located on the mining truck 102 or on separate external devices that house the lifting equipment 132.

The lifting and refueling hardware 130 and/or lifting equipment 132 can be hydraulic or mechanical lifting rams or craneage, and can be electronically, mechanically, manually, and/or automatically operated. The lifting hardware 130 or lifting equipment 132 can be guided into position and docked with the vehicle fuel tanks 108. Once safely docked, the lifting hardware 130 or lifting equipment 132 can notify the mining truck 102 and ground crew or operator of a successful dock via a notification or equipment indicator 131 (as previously described).

The notification 131 can be performed or conducted manually or automatically. For example, the notification 131 can be done by a machine vision confirmation or by some other sensor technology. Through the use of optical or proximity sensors, the lifting hardware 130 or lifting equipment 132 could be configured to automatically refill the vehicle fuel tanks 108 or swap the vehicle fuel tanks 108 without requiring people (e.g., a ground crew or operator). Thus, the entire refueling event can be performed automatically and not manually or semi-manually.

Various components 112 including pipes, devices, hydrogen lines, or electronic connections are manually or automatically disconnected in step 306. Some components 112 (e.g., electrical connections) are electrically bonded to avoid static or sparks, and are typically routed in the vehicle 100 to avoid contact with parts of the mining truck 102 that can generate sparks (e.g., fire). Some components 112 (e.g., hydrogen lines) can include a continuity measurement across an electrical connector to provide a signal to the controller 190 or vehicle controller 194 that the hydrogen lines and electronic connections have been disconnected. Visual and/or audio indicators 121 can also be used to indicate connection and disconnection (FIG. 2).

When the various components 112 including hydrogen lines and electronic connections have been disengaged in step 306 of FIG. 4, the lifting hardware 130 or lifting equipment 132 receives a signal to prepare for vehicle fuel tank 108 removal. One or more vehicle fuel tanks 108 are then disconnected from the mining truck 102 in step 308 electronically, mechanically, manually, and/or automatically. The vehicle fuel tanks 108 and the mining truck 102 can be connected together by a connector 109, such as a manual bolted connection or by a quick-release mounting system. Once the connector 109 is disconnected, the lifting hardware 130 or lifting equipment 132 then removes one or more vehicle fuel tanks 108 from the mining truck 102 to the swap location 116 in step 310. The one or more vehicle fuel tanks 108 can then be moved to a safe storage location in step 312.

The mining truck 102 may include sensors 114 that aid in communication with the swap location 116 and/or the fueling station 110. The sensors 114 may be present on the vehicle fuel tanks 108 and/or at other locations on the mining truck 102. Each vehicle fuel tank 108 in the mining truck 102 may include an identification, which may be tracked along with operating data of the mining truck 102. The identification of any vehicle fuel tank 108 may be in the form of a unique identifier (e.g., a number, code, etc.) that is only associated with the vehicle fuel tank 108. The identification on each vehicle fuel tank 108 may be a physical or an electronic identification device or apparatus, such as RFIDs, bar codes, or other unique identification tags.

Operating data can be indicative of the temperature and pressure of the hydrogen 19 in the vehicle fuel tanks 108. Operating data can be used to determine the amount of hydrogen 19 in the vehicle fuel tanks 108. Operating data can include but is not limited to mining truck 102 power demand, mining truck 102 fuel consumption, ambient conditions, mining truck 102 drive profiles, vehicle fuel tank 108 characteristics (e.g., pressure, temperature, flow rate, etc.), and/or power split between individual fuel cell modules 14 and batteries 106.

Identifiers such as RFIDs or identification tags on the station fuel tanks 118 stored at the swap location 116 are used to compare the operating data of the mining truck 102 to ensure that the station fuel tanks 118 are compatible with the vehicle fuel tanks 108 in the mining truck 102. Compatibility for the mining trucks 102 to the station fuel tanks 118 is determined by the controller 190 or station controller 192. Similarly, identification data can also be used to track the station fuel tanks 118 after they are installed.

Correctly identified station fuel tanks 118 are lifted into position on 191 by the lifting hardware 130 or lifting equipment 132 in step 314. Machine vision or other alignment tools and methods are used to ensure that the lifting hardware 130 or lifting equipment 132 can easily locate and align the station fuel tanks 118 (i.e., a new, full, prefilled, or filled vehicle fuel tanks 108) in a correct position on the mining truck 102 in step 316.

Once safely located on the mining truck 102, the new vehicle fuel tanks 108 are secured to the mining truck 102. Machine vision or other methods are implemented via the controller 190 in the mining truck 102 to automatically confirm that the new vehicle fuel tanks 108 are securely located and refitted in step 318. The various components 112 including hydrogen lines and electronic connections are then reattached and fitted securely in step 320. Continuity, machine vision, and/or other automated systems are implemented via the controller 190 in the mining truck 102 to confirm that the various components 112, including hydrogen lines and electronic connections, have been configured correctly in step 322.

The mining truck 102 is subjected to a pre-purge safety check. The hydrogen 19 in the mining truck 102 is purged using the automatic control valves 122 in step 324. When connecting to the refueling piping, there may be some extraneous hydrogen 19 that will escape the system 101 upon a refill event. The pre-purge safety check includes ensuring that the escape of any extraneous hydrogen 19 in the various components 112 including pipes, devices, hydrogen lines, and/or electronic connections occurs in a safe region and in a controlled manner. A final safety check is executed manually or automatically in step 326. The ground crew or operator and/or lifting equipment 132 are moved away from the mining truck 102. The controller 190 and/or vehicle controller 194 confirm that the mining truck 102 is ready for departure. The mining truck 102 then leaves the swap location 116 in step 328.

The quick-swap method may include surveying the environmental and ground conditions prior to swapping the vehicle fuel tank 108 with the station fuel tanks 118. For example, if the ground conditions indicate the presence of gravel or concrete, the controller 190 and/or station controller 192 may perform a stability check. In some embodiments, prior to operating any hydrogen power source in the mining truck 102, nitrogen or air may be used in the various components 112 including hydrogen lines 112 to ensure the absence of leaks. A pressure sensor 123 may be used to ensure a tight connection before setting the current for hydrogen 19 flow (FIG. 2).

Figure 5:
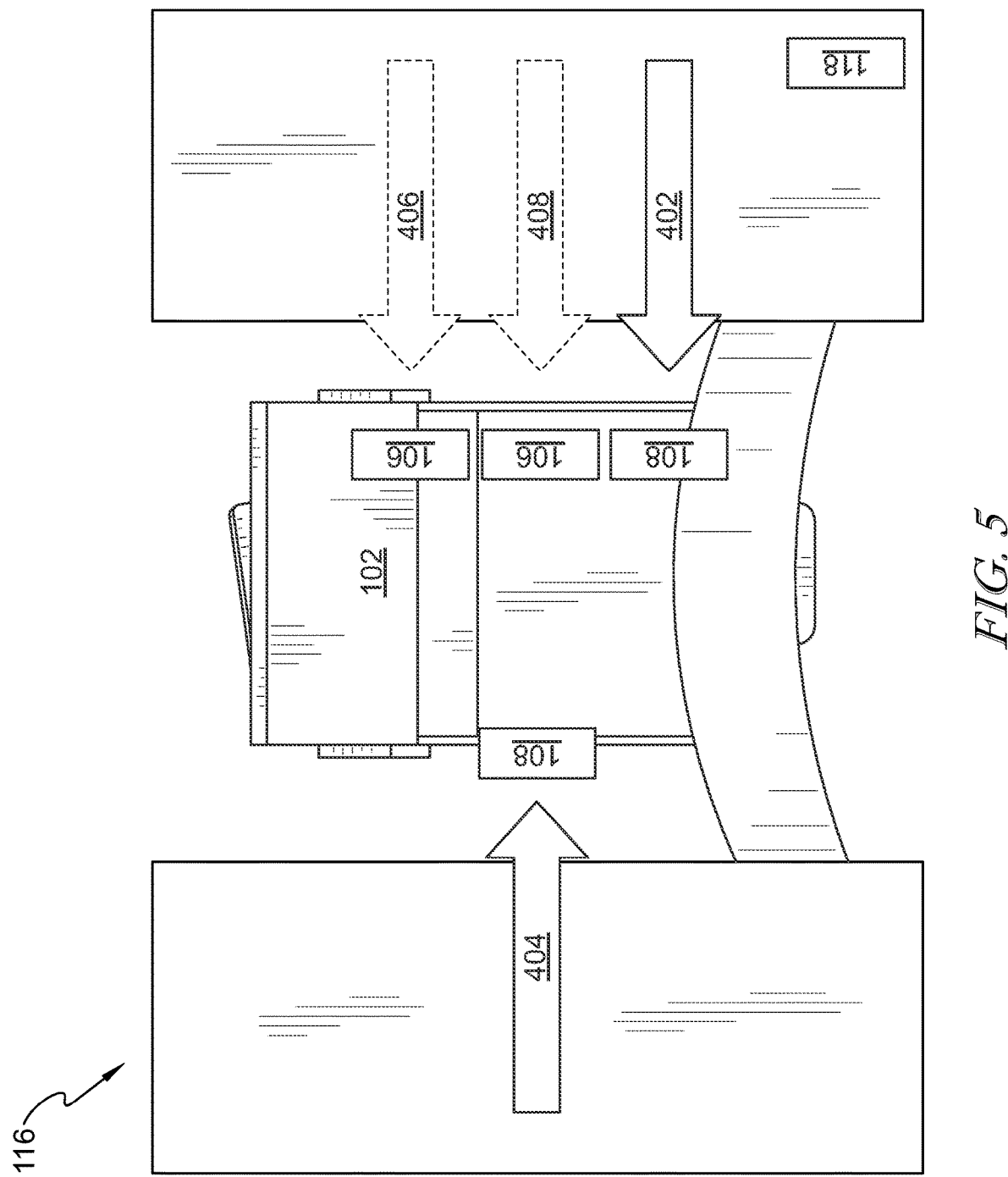
FIG. 5 is an illustration showing different strategies that can be adopted for powering a vehicle.

As shown in FIG. 5, the mining truck 102 may have both swappable and refillable energy sources. The mining truck 102 may engage in swapping 402 the vehicle fuel tanks 108, filling 404 the vehicle fuel tanks 108, swapping 406 the battery 106 and/or charging 408 the battery 106. For example, the mining truck 102 may have a first set of empty or partially filled vehicle fuel tanks 108 that can be removed (e.g., taken out) and replaced with station fuel tanks 118. The mining truck 102 may also have a second set of empty or partially filled vehicle fuel tanks 108 that can be refilled without removing them from the mining truck 102. The second set of vehicle empty or partially filled fuel tanks 108 may be refilled while the first set of empty or partially filled vehicle fuel tanks 108 are being swapped. Additionally or alternatively, the mining truck 102 can have a first set of batteries 106 that can be swapped and a second set of batteries 106 that can only be recharged.

The decision to swap or refill (or recharge) a power source (e.g., vehicle fuel tanks 108, battery 106) may depend on various operating conditions of the fuel cell 20 or the battery 106. Fuel cell 20 or battery 106 operating conditions that may determine whether swapping, refueling, and/or recharging should be performed includes, but is not limited to, route characteristics of the mining truck 102, temperature at the swap location 116 in the fueling station 110, health of batteries 106, health of any fuel cell modules 14, and/or ability and type of the fueling station 110. Considerable operating conditions also include the time needed for swapping, refueling, or recharging the power sources.

In some embodiments, one or more fully or partially filled vehicle fuel tank 108 in the mining truck 102 may need to be purged before the mining truck 102 can be serviced for any repair. For example, if the service station 110 is indoors, the vehicle fuel tanks 108 may be removed from the mining truck 102 before entering the enclosed space in order to avoid boil-off issues associated with the fuel. These full or partially full vehicle fuel tanks 108 removed from the mining truck 102 may be used in other vehicles to avoid the hydrogen 19 fuel from escaping into the atmosphere. Alternatively, the vehicle fuel tanks 108 may be purged of hydrogen 19 or other fuels, for example, through a catalyst system that converts the hydrogen 19 into water. Once the vehicle fuel tanks 108 are removed from the mining truck 102 or the fuel is removed from the vehicle fuel tanks 108, the mining truck 102 may move in and out of an enclosed space freely by using battery 106 power.

The controller 190, the station controller 192, the vehicle controller 194, and/or the operator of the mining truck 102 may determine the type and amount of fuel or power source present on the mining truck 102. The controller 190, the station controller 192, the vehicle controller 194, and/or the operator of the mining truck 102 may also determine the type and amount of fuel or power source available at the swap location 116 in the fueling station 110. The decision to swap, refuel, or recharge a power source is optimized accordingly.

Additionally, after the quick-swap, the controller 190, the vehicle controller 194, or the operator of the mining truck 102 may adjust future power source usage. Future power source use may be adjusted based on anticipated vehicle usage, vehicle operating conditions, distance to next fueling station 110, type and ability of the next fueling station 110, state of charge of the batteries 106, and/or hydrogen 19 fuel level in the vehicle fuel tanks 108. The controller 190, the vehicle controller 194, or the operator of the mining truck 102 may also have access to real-time information such as changes in weather conditions, traffic patterns, and/or fuel price fluctuations.

The controller 190 can use optimization and predictive algorithms to efficiently refill the vehicle fuel tanks 108 in the mining truck 102 entering the swap location 116. As shown in FIG. 6, a dispensing nozzle 502 can be used to fill vehicle fuel tanks 108 and/or the station fuel tanks 118 with fuel (e.g., hydrogen 19). Hydrogen 19 is fed through the dispensing nozzle 502 from a high-pressure hydrogen storage tank 504 through a chilling device 506 that is implemented to keep the hydrogen 19 cooled. The temperature of the hydrogen 19 in the chilling device 506, as well as the temperature of the chilling device 506, may range from about −50° C. to about −10° C., including any temperature or range comprised therein.

A fuel tank assembly 128 can include one or more rack modules 520 and each rack module 520 can include one or more vehicle fuel tanks 108 or station fuel tanks 118. The vehicle fuel tanks 108 and the station fuel tanks 118 with one or more cylinders can be filled electronically, mechanically, automatically, and/or manually. The controller 190, the station controller 192, or the vehicle controller 194 can efficiently manage the filling of the vehicle fuel tanks 108 and/or the station fuel tanks 118. The vehicle fuel tanks 108 may have a hardware interface that receives the dispensing nozzle 502 at the swap location 116. The hardware interface may be based on the industry standards (e.g., SAE J2600 and J2601 standards). Alternatively, or additionally, the hardware interface may be based on other standards and/or vehicle requirements.

The controller 190, the station controller 192, or the vehicle controller 194 can determine and/or measure different tank pressure in the vehicle fuel tanks 108 and in the station fuel tanks 118. The dispensing nozzle 502 allows filling the vehicle fuel tanks 108 only if the pressure in the vehicle fuel tanks 108 is determined to be equal or lower than the pressure in the hydrogen storage tank 504. The station controller 192 can also account for any movement of vehicles, parts or people at the swap location 116 or fueling station 110. The station controller 192 can also account for environmental conditions when determining a filling strategy.

The controller 190, the station controller 192, or the vehicle controller 194 can determine a filling method that allows one or more vehicle fuel tanks 108 or one or more station fuel tanks 118 to be filled simultaneously. The filling of the vehicle fuel tanks 108 (or station fuel tanks 118) can be automated with controllable valves 510, which initiate hydrogen 19 flow based on sensory feedback and connection integrity between the vehicle fuel tanks 108 (or station fuel tanks 118) and the dispensing nozzles 502. The tank filling rate and tank filling time is also dependent on the vehicle fuel tank 108 pressure (or station fuel tank 118 pressure).

One or more fuel storage vessels (e.g., vehicle fuel tanks 108, station fuel tanks 118) capable of storing hydrogen 19 in any physical state may be included in the fuel tank assembly 128. The vehicle fuel tanks 108 or station fuel tanks 118 in the fuel tank assembly 128 are bound together to form rack modules 520 using a mechanical structure 512 that renders the vehicle fuel tanks 108 or station fuel tanks 118 difficult to separate. The vehicle fuel tanks 108 or station fuel tanks 118 are difficult to separate because the fuel tank assembly 128 is considered a semi-permanent assembly that may be removed and reinstalled on the mining truck 102 as an assembly of multiple tanks as opposed to one tank at a time.

One or more fuel tank assemblies 128 in a swap location 116 and/or in the mining truck 102 may be filled simultaneously. Depending on mining site operations of the mining truck 102, driver shift changes, future traffic patterns, and/or other variables, the station controller 192 or the vehicle controller 194 can fill the fuel tank assemblies 128 completely or partially. The controller 190 can actively predict availability of filled station fuel tanks 118 and the number of other vehicles approaching the fueling station 110.

The controller 190 may know the whereabouts of a fleet of vehicles being serviced in the fueling station 110, which vehicle 100 is most in need of refueling, and prioritize which vehicle 100 is refueled before another. This prioritization can avoid queues at the fueling station 110 and help to minimize the downtime associated with refueling the mining truck 102. This prediction can also help a site management software manage the fueling station 110 operations without queuing or postponing other vehicles from fueling for a long period of time.

The station controller 192 or the vehicle controller 194 can identify the one or more fuel tank assemblies 128 either through code based (e.g., barcode) scanning or through a different mechanism. The station controller 192 or the vehicle controller 194 can identify and differentiate the pressure in the different tank assemblies 128 or identify the tank assemblies 128 through connection interface-based electronics identifiers 514. Connection interface-based electronics identifiers 514 ensure a robust connection at hydrogen 19 interfaces to prevent hydrogen 19 leaks. Determination of pressure in the different tank assemblies 128 enables the station controller 192 or the vehicle controller 194 to precalculate the filling time for each tank assembly 128 and provide real-time feedback to the controller 190 on availability of fully filled station fuel tanks 118.

The tank assembly 128 may have a tank system controller 196. The tank system controller 196 is an electronic device that can accept signals from various sensors (e.g., pressure sensors 123) and control devices 125 in the tank assembly 128. The pressure sensors 123 can determine the current pressure in the different tank assemblies 128. The tank system controller 196 can communicate tank system information 66 through connection interface based electronics identifiers 514 to the fueling station 110 or swap location 116. The tank system information 66 can include the rated pressure and current pressure in the different tank assemblies 128 and the identity of the tank assemblies 128 determined via physical or electronic identifiers such as RFIDs or identification tags.

The tank system controller 196 can communicate the tank system information 66 with the fueling station 110 or swap location 116 wirelessly or through a wired connection. The tank system controller 196 can have the added functionality of keeping track of fill cycles for the vehicle fuel tanks 108 and station fuel tanks 118, selectively filling only those fuel tanks 108, 118 that do not have any operating problems (e.g., poor performance unrelated to low fuel or charge levels).

The tank assemblies 128, vehicle fuel tanks 108, and station fuel tanks 118 can be managed and identified based on pressure ratings. The pressure ratings can be determined by differences due to physical connection. The pressure ratings can be manually determined and/or automatically determined by the tank system controller 196. The pressure ratings can be used to determine a filling pressure or to calculate on-vehicle energy availability in the mining truck 102.

The tank system controller 196 can directly communicate the pressure limits of the tank assembly 128, the vehicle fuel tanks 108, and the station fuel tanks 118 with the fueling station 110, the swap location 116, and/or the mining truck 102. Alternatively or additionally, the tank system controller 196 can indirectly communicate the pressure limits of the tank assembly 128, the vehicle fuel tanks 108, and the station fuel tanks 118 through the controller 190, the station controller 192, and/or the vehicle controller 194.

Sensors 114, 124, 126 can be used to differentiate between different pressure rated vehicle fuel tanks 108 and/or station fuel tanks 118. Different vehicle fuel tanks 108 have different rated pressures of gas within them. Typical hydrogen 19 pressures for vehicle fuel tanks 108 and/or station fuel tanks 118 are about 350 bar to about 700 bar, including any specific or range of pressure comprised therein. When the quick-swap of tanks is being implemented, the rated pressure of the vehicle fuel tank 108 is identified, measured, and/or detected. The sensors may be onboard sensors 114 on the mining truck 102 or may be fueling station sensors 124 located at the swap location 116 or elsewhere at the fueling station 110. Additionally or alternatively, the sensors 124 may include tank system sensors 126 located within the tank assembly 128.

The sensors 114, 124, 126 can directly detect and communicate the real-time pressure measurements and/or pressure limits of the tank assemblies 128, the vehicle fuel tanks 108, and/or the station fuel tanks 118 by audio or visual signals. The tank system controller 196 and the sensors 114, 124, 126 may be combined to form a redundant and/or complimentary system of communication to ensure safety.

The fueling station 110 can have specified locations where filled station fuel tanks 118 and tanks assemblies 128 are stored. Site management software guidance can be used to ensure that sufficient station fuel tanks 118 are located at different locations in the fueling station 110 to enable vehicles to be filled away from the swap locations 116.

Machine vision, including barcode, QR code, and/or a wireless communication protocols can be used to identify the tank assembly 128. The barcodes can be laser engraved or laser cut to remove material to enable readability under harsh environmental conditions. The fueling station 110, the swap location 116, and/or the mining truck 102 can identify the tank assembly 128 by using machine vision instead of or in addition to utilizing the tank system controller 196.

Machine vision and/or the tank system controller 196 can be used to identify the lifting hardware 130 or lifting equipment 132 required for filling or refueling the vehicle fuel tanks 108 in the tank assembly 128. For example, a 700 bar tank assembly 128 can be filled to 350 bar if the fueling station 110 or swap location 116 has a filling capacity of 350 bar. A 350 bar tank assembly 128 can be filled by a 700 bar capable fueling station 110 or swap location 116 if the tank system controller 196 and the tank system sensors 126 are used appropriately to terminate the filling process at the appropriate time. Thus, multi-pressure systems that may exist at the fueling station 110 or swap location 116 can be utilized independent of the constraints of the vehicle fuel tanks 108 of the mining truck 102. This allows for better utilization of resources and existing assets at the fueling station 110 or swap location 116.

The vehicle fuel tank 108, station fuel tanks 118, and/or the tank assemblies 128 have a connection nozzle 522 that connects to the dispensing nozzle 502 of the fueling station 110. The fueling station 110 can provide a seal 524 to the connection nozzle 522 after the vehicle fuel tank 108 and station fuel tanks 118 are filled with hydrogen 19. The connection nozzle 522 in the filled vehicle fuel tank 108 and station fuel tanks 118 can be tagged with an identifier to label the vehicle fuel tank 108 and station fuel tanks 118 as filled, partially filled, or empty.

The seal 524 can be punctured or pushed out to establish connection with the tank assembly 128 on the mining truck 102. The seal 524 can also act as a dust and moisture barrier to prevent debris accumulation. The seal 524 can improve efficiency as debris can affect the establishment of a tight connection with components on the mining truck 102 or affect refilling of the vehicle fuel tank 108 and station fuel tanks 118.

A quick connect mechanism enables one physical entity to establish a connection or interface with a second physical entity in a very short time period. For example, the quick connect mechanism can be used to enable connection of the dispensing nozzle 502 to the connection nozzle 522. The quick connect mechanism can be used to establish a connection between the dispensing nozzle 502 and the connection nozzle 522 at the swap location 116 and/or in the mining truck 102. The quick connect mechanism can be established with or without human interaction and can be based on conditional checks performed by mechanical or electronic devices to ensure safe connection and/or disconnection (e.g., with no leakage).

The conditional checks for establishing the quick connect mechanism include criteria for initiating connection or disconnection of the dispensing nozzle 502 either with the swap location 116 or with the mining truck 102. The criteria are based on factors including, but not limited to, ambient conditions, initiation request time out, and/or alignment check.

The dispensing nozzle 502 can employ mechanical devices 501 including either pneumatics or hydraulics to achieve a positive engagement of the dispensing nozzle 502 of the swap location 116 or with the mining truck 102 and the connection nozzle 522 in the tank assembly 128 to prevent accidental release of fuel. The mechanical devices 501 can include control based safety interlock systems to ensure that several parameters are met before releasing the tank assembly 128 from the dispensing nozzle 502. The releasing parameters can include, but are not limited to, purging of hydrogen 19 from tank assembly plumbing, ensuring a release trigger is not active, and/or ensuring the assembly is secured.

Similarly, certain engagement parameters may need to be met before the connection nozzle 522 of the tank assembly 128 is deemed via the tank system controller 196 to be fully engaged to the dispensing nozzle 502 of the swap location 116 or the mining truck 102. These engagement parameters can include, but are not limited to, ensuring an alignment correct trigger 516 is not active and/or ensuring an in-position trigger 518 is not active. Positive engagement can be ensured by implementing mechanical devices 505, such as an infrared, positive contact trigger switch. Positive engagement can also utilize electrical continuity as an engagement check mechanism.

The quick connect mechanism to engage the dispensing nozzle 502 and the connection nozzle 522 in the tank assembly 128 or to engage the mining truck 102 to the swap location 116 can also be aided by other technologies, such as computer vision, depth vision, and/or learning algorithms to enable proper alignment before establishment of a connection. These technologies can be used to detect debris or clogging in any connection interface. The quick connect mechanism can also utilize air pressure to unclog debris or provide an air curtain to prevent debris accumulation during or before connection establishment.

The dispensing nozzle 502 may also have a cover 503. The cover 503, which is deployed after release of the connection to prevent the entry of debris into the nozzle. The cover protects the nozzle, and may be similar to any other cover in a tamper proof plug point or juncture.

The one or more controllers 190, 192, 194, 196 are configured for monitoring, regulating, manipulating, and/or controlling the components of the vehicle (e.g., mining truck 102), the fueling station 110, and/or the tank assembly 128 and may be implemented, in some cases, in communication with hardware, firmware, software, or any combination thereof. The hardware, firmware, software, or any combination thereof may be present on or outside the vehicle 100. The one or more controllers 190, 192, 194, 196 may also control the physical or virtual sensors 114, 123, 124, 126 via hardware, firmware, software, or any combination thereof present on or outside the vehicle 100. Information may be transferred to the one or more controllers 190, 192, 194, 196 using any one or more communication technology (e.g., wired or wireless communications) and associated protocols (e.g., Ethernet, InfiniBand®, Wi-Fi®, Bluetooth®, WiMAX, 3G, 4G LTE, 5G, etc.) to effect such communication.

The one or more controllers 190, 192, 194, 196 may be the same device. The one or more controllers 190, 192, 194, 196 may be configured in one or more computing devices. The computing device may be embodied as any type of computation or computer device capable of performing the functions described herein. The computing device includes, but is not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system or a single processor system, a smartphone, a tablet computer, a laptop computer, a notebook computer, and/or a mobile computing device.

A first aspect of the present invention relates to a method of refueling a vehicle. The method comprises identifying a refueling station, conducting a safety check on the vehicle based on a distance between the vehicle and the refueling station, switching a power source of the vehicle to only comprise a battery, swapping an empty or partially filled vehicle fuel tank on the vehicle with a filled station fuel tank at the refueling station, and switching the power source of the vehicle to include a hydrogen power source.

A second aspect of the present invention relates to a system for refueling a vehicle. The system comprises one or more vehicle fuel tanks on the vehicle, a refueling station with a swap location, a hydrogen-filling site, one or more station fuel tanks, and a system controller. The one or more station fuel tanks are filled with hydrogen and positioned at the swap location or at the hydrogen-filling site. The system controller is configured to be in communication with the refueling station, the swap location, and the hydrogen-filling site.

In the first aspect of the present invention, the method may further comprise enabling a vehicle cooling system to cool the empty or partially filled vehicle fuel tank on the vehicle before swapping the empty or partially filled hydrogen fuel tank with the filled station fuel tank. In the first aspect of the present invention, the method may further comprise identifying a swap location located in the refueling station after switching the power source of the vehicle to only comprise the battery, wherein the filled station fuel tank is located at the swap location in the refueling station.

In the first aspect of the present invention, the swapping the empty or partially filled vehicle fuel tank may comprise disconnecting the empty or partially filled vehicle fuel tank from the vehicle, removing the empty or partially filled vehicle fuel tank from the vehicle with a lifting equipment, moving the filled station fuel tank from the swap location into the vehicle with the lifting equipment, and aligning the filled station fuel tank in the vehicle. In the first aspect of the present invention, the method may further comprise syncing one or more sensors in the swap location to one or more sensors on the vehicle.

In the first aspect of the present invention, the method may further comprise enabling autonomous drive control of the vehicle before swapping the empty or partially filled vehicle fuel tank and enabling operator control of the vehicle after switching the power source of the vehicle to include the hydrogen power source. In the first aspect of the present invention, the method may further comprise conducting the safety check comprises purging hydrogen from a hydrogen line in the vehicle and disconnecting electrical connections from the hydrogen line in the vehicle before swapping the empty or partially filled vehicle fuel tank with the filled station fuel tank.

In the first aspect of the present invention, the method may further comprise reconnecting the hydrogen line in the vehicle and purging the hydrogen line in the vehicle before swapping the empty or partially filled vehicle fuel tank with the filled station fuel tank. In the first aspect of the present invention, the method may further comprise providing the vehicle with a lifting equipment, wherein the lifting equipment is located at the identified swap location before swapping the empty or partially filled vehicle fuel tank with the filled station fuel tank.

In the first aspect of the present invention, the method may further comprise identifying the refueling station, conducting the safety check on the vehicle, switching the power source of the vehicle to the battery, swapping the empty or partially filled vehicle fuel tank on the vehicle with the filled station fuel tank, or switching the power source of the vehicle to the hydrogen power source is automatically performed by a controller. In the first aspect of the present invention, the method may further comprise charging the battery or swapping the battery for a different battery. In the first aspect of the present invention, the method may further comprise refilling a first empty or partially filled vehicle fuel tank on the vehicle and swapping a second empty or partially filled vehicle fuel tank with the filled station fuel tank at the refueling station.

In the second aspect of the present invention, the system may further comprise a hydrogen storage location and the system controller may be configured to determine a transfer of hydrogen from the hydrogen storage location to the hydrogen-filling site through a pipeline infrastructure. In the second aspect of the present invention, the one or more empty station fuel tanks may be filled with hydrogen at the hydrogen-filling site through a quick connect mechanism.

In the second aspect of the present invention, the vehicle may further comprise a sensor to determine a pressure of the one or more vehicle fuel tanks, an identifier on the one or more vehicle fuel tanks, and a vehicle controller configured to communicate the pressure of the one or more vehicle fuel tanks and the identifier on the one or more fuel tanks to the system controller. In the second aspect of the present invention, the system controller may be configured to determine if the swap location includes one or more station fuel tanks compatible with the identifier on the one or more vehicle fuel tanks.

In the second aspect of the present invention, the one or more vehicle fuel tanks may be swapped with one or more station fuel tanks at the swap location. In some embodiments, the one or more vehicle fuel tanks may be filled with hydrogen at the swap location. In the second aspect of the present invention, the swap location may further comprise a lifting equipment to move and align the one or more station fuel tanks in the vehicle.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope.

While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of refueling a vehicle comprising:
conducting a safety check on the vehicle based on a distance between the vehicle and a refueling station,
switching a power source of the vehicle to only comprise a battery,
swapping an empty or partially filled vehicle fuel tank with a filled station fuel tank at the refueling station,
switching the power source of the vehicle to include a hydrogen power source, and
enabling a vehicle cooling system to cool the empty or partially filled vehicle fuel tank before swapping the empty or partially filled vehicle fuel tank with the filled station fuel tank.

2. The method of claim 1, further comprising identifying a swap location located in the refueling station for refueling, wherein the filled station fuel tank is located at the swap location in the refueling station.

3. The method of claim 2, wherein swapping the empty or partially filled hydrogen fuel tank comprises
disconnecting the empty or partially filled vehicle fuel tank from the vehicle,
removing the empty or partially filled vehicle fuel tank from the vehicle with a lifting equipment,
moving the filled station fuel tank from the swap location into the vehicle with the lifting equipment, and
aligning the filled station fuel tank in the vehicle.

4. The method of claim 2, further comprising syncing one or more sensors in the swap location to one or more sensors on the vehicle.

5. The method of claim 4, further comprising enabling autonomous drive control of the vehicle before swapping the empty or partially filled vehicle fuel tank and enabling operator control of the vehicle after switching the power source of the vehicle to include the hydrogen power source.

6. The method of claim 1, wherein conducting the safety check comprises purging hydrogen from a hydrogen line in the vehicle and disconnecting electrical connections from the hydrogen line in the vehicle before swapping the empty or partially filled vehicle fuel tank with the filled station fuel tank.

7. The method of claim 6, further comprising reconnecting the hydrogen line in the vehicle and purging the hydrogen line in the vehicle before swapping the empty or partially filled vehicle fuel tank with the filled station fuel tank.

8. The method of claim 2, further comprising providing the vehicle with a lifting equipment, wherein the lifting equipment is located at the identified swap location before swapping the empty or partially filled vehicle fuel tank with the filled station fuel tank.

9. The method of claim 1, wherein identifying the refueling station, conducting the safety check on the vehicle, switching the power source of the vehicle to the battery, swapping the empty or partially filled vehicle fuel tank on the vehicle with the filled station fuel tank, or switching the power source of the vehicle to the hydrogen power source is automatically performed by a controller.

10. The method of claim 1, wherein the method further comprises charging the battery or swapping the battery for a different battery.

11. The method of claim 1, further comprising refilling a first empty or partially filled vehicle fuel tank on the vehicle and swapping a second empty or partially filled vehicle fuel tank with the filled station fuel tank at the refueling station.

12. A system for refueling a vehicle comprising:
one or more vehicle fuel tanks on the vehicle,
a refueling station with a swap location,
a hydrogen-filling site,
one or more station fuel tanks filled with hydrogen and positioned at the swap location or at the hydrogen-filling site,
a vehicle cooling system to cool one or more vehicle fuel tank before swapping the one or more vehicle fuel tanks with the one or more station fuel tanks filled with hydrogen, and
a system controller configured to be in communication with the refueling station, the swap location, and the hydrogen-filling site.

13. The system of claim 12, wherein the system further comprises a hydrogen storage location and the system controller is configured to determine a transfer of hydrogen from the hydrogen storage location to the hydrogen-filling site through a pipeline infrastructure.

14. The system of claim 13, wherein one or more empty station fuel tanks are filled with hydrogen at the hydrogen-filling site through a quick connect mechanism.

15. The system of claim 12, wherein the vehicle further comprises a sensor to determine a pressure of the one or more vehicle fuel tanks, an identifier on the one or more vehicle fuel tanks, and a vehicle controller configured to communicate the pressure of the one or more vehicle fuel tanks and the identifier on the one or more vehicle fuel tanks to the system controller.

16. The system of claim 15, wherein the system controller is configured to determine if the swap location includes one or more station fuel tanks compatible with the identifier on the one or more vehicle fuel tanks.

17. The system of claim 12, wherein the one or more vehicle fuel tanks are swapped with the one or more station fuel tanks at the swap location.

18. The system of claim 17, wherein one or more empty or partially filled vehicle fuel tanks are swapped with full station fuel tanks at the swap location or filled with hydrogen at the swap location.

19. The system of claim 12, wherein the swap location further comprises a lifting equipment to move and align the one or more station fuel tanks onto the vehicle.

20. A method of refueling a vehicle comprising:
conducting a safety check on the vehicle based on a distance between a vehicle and the refueling station,
switching a power source of the vehicle to only comprise a battery,
swapping an empty or partially filled vehicle fuel tank with a filled station fuel tank at the refueling station,
switching the power source of the vehicle to include a hydrogen power source, and
syncing one or more sensors in a swap location located in the refueling station to one or more sensors on the vehicle, wherein the filled station fuel tank is located at the swap location.

* * * * *